| United States Patent [19] | [11] | 4,406,343 |
|---|---|---|
| Harasaki | [45] | Sep. 27, 1983 |

[54] ENGINE MOUNTING STRUCTURE FOR AN AUTOMOBILE BODY

[75] Inventor: Hayathugu Harasaki, Hiroshima, Japan

[73] Assignee: Toyo Kogyo Co. Ltd., Hiroshima, Japan

[21] Appl. No.: 272,069

[22] Filed: Jun. 9, 1981

[30] Foreign Application Priority Data

Jun. 13, 1980 [JP] Japan ................................. 55-80617

[51] Int. Cl.³ .............................................. B60K 5/10
[52] U.S. Cl. .................................. 180/297; 180/312; 296/194
[58] Field of Search ...................... 180/292, 297, 312; 296/204, 35.1, 194; 280/795, 797, 800

[56] References Cited

U.S. PATENT DOCUMENTS 3,204,717  9/1965  Collins ............................... 180/292
4,263,980  4/1981  Harlow .............................. 180/292
4,266,629  5/1981  Friedrich ........................... 180/312

Primary Examiner—David M. Mitchell
Assistant Examiner—Joseph G. McCarthy
Attorney, Agent, or Firm—Fleit, Jacobson, Cohn & Price

[57] ABSTRACT

An automobile body of a front-engine-front drive type has an engine located in the engine compartment with the crankshaft directed transversely. The frame assembly for supporting the power unit comprising the engine and the transmission device is constituted by side and cross-members which are connected together to form a rectangular configuration. One of the side members is formed with a transversely inward extension on which an engine mounting bracket is provided. One of the cross-member is also connected to the extension so as to stiffen it to thereby provide a desired rigidity.

14 Claims, 12 Drawing Figures

ENGINE MOUNTING STRUCTURE FOR AN AUTOMOBILE BODY

The present invention relates to an automobile body and more particularly to a front structure of an automobile body. More specifically, the present invention pertains to an engine mounting front structure of an automobile.

In an automobile of front-engine - front-drive type, a widely adopted arrangement has an engine mounted with its crankshaft extending transversely with respect to the longitudinal axis of the automobile body. In this type of automobile, the engine is mounted through engine mounts on a sub-frame assembly provided at the lower portion of the engine compartment. For this purpose, the sub-frame assembly is formed with a plurality, usually three, of engine mounting brackets for locating the engine mounts.

In conventional structures, it has often been impossible to provide the engine mounting brackets directly on the sub-frame assembly due to limitations in space. In order to solve the problem, the conventional structures include transversely inward extensions formed integrally or connected with the sub-frame assembly for supporting the engine mounting brackets in canti-lever fashion. Such conventional structures have been found disadvantageous in that the extensions do not have sufficient strength and rigidity for supporting the engine.

It is therefore an object of the present invention to provide an automobile front body structure in which the engine can be mounted with a sufficient strength and rigidity.

Another object of the present invention is to provide an automobile front body structure having a sub-frame assembly which can afford engine mounting brackets of sufficient rigidity.

According to the present invention, the above and other objects can be accomplished by an automobile body including a front body section formed with an engine compartment, sub-frame means provided in a lower portion of the engine compartment for mounting an engine, said sub-frame means comprising a plurality of longitudinally extending side members and a plurality of transversely extending cross-members, at least one of said side members being of a closed cross-section having an upper wall and a bottom wall, said bottom wall of the side member being formed with at least one transversely inward extension, an engine mounting bracket provided on said extension, one of said cross-members having one end secured to said extension and the other end secured to the other of the side members.

According to the features of the present invention, the load of the engine applied through the engine bracket to the extension of the side member bottom wall is distributed to the side and cross-members and the extension is sufficiently stiffened by the cross-member. In a preferable arrangement, the one end of the cross-member is also secured to the upper wall of the side member to provide an increased rigidity. It is further preferable that all of the side and cross-members be of a closed cross-section. The cross-member may preferably be comprised of a first part secured to the extension of the side member bottom wall and a second part removably secured at one end to the first part and at the other end to the other side member.

The above and other objects and features of the present invention will become apparent from the following descriptions of a preferred embodiment taking reference to the accompanying drawings, in which.

Figure 1:
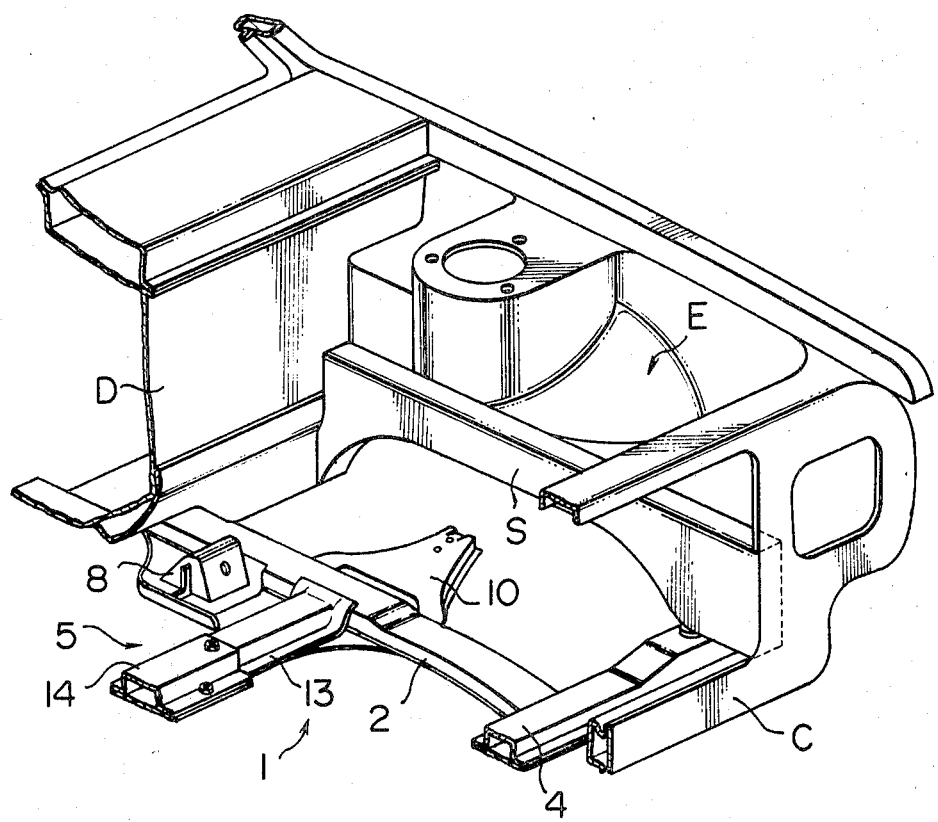
FIG. 1 is a fragmentary perspective view of an automobile front body structure embodying the features of the present invention.

Referring now to the drawings, particularly to FIG. 1, there is shown an automobile front body structure having a front frame side member S extending at one side longitudinally forwardly from a dash panel D. Although not shown in FIG. 1, a similar side member is provided at the other side. The front body structure further has a front frame cross-member C extending transversely between the front ends of the front frame side members S. The front frame thus formed defines an engine compartment E at the front end portion of the body.

Figure 2:
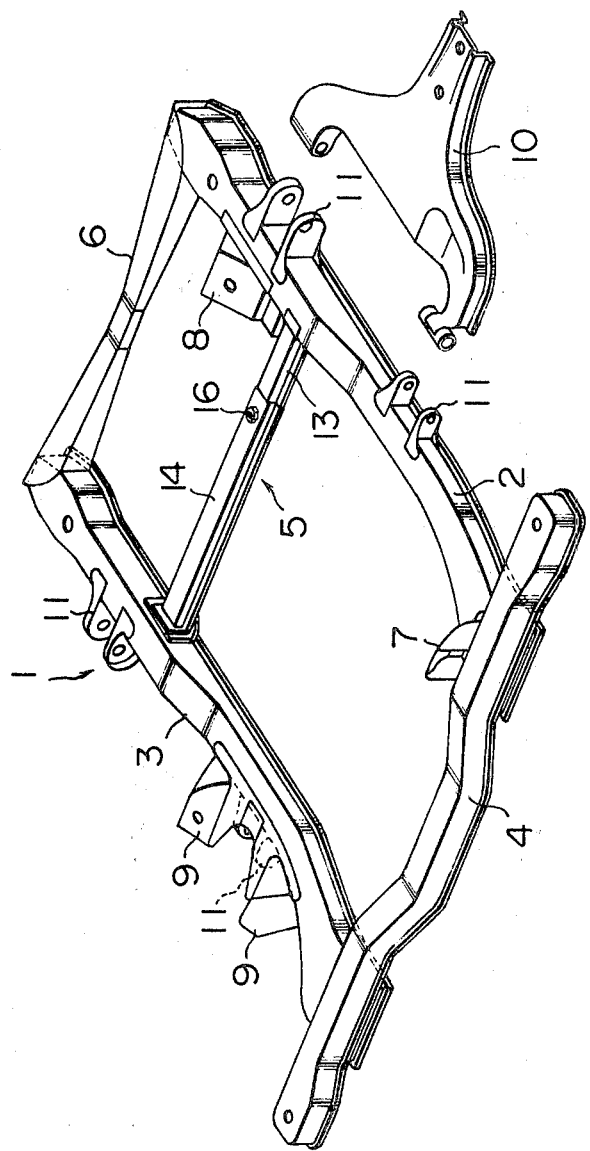
FIG. 2 is a perspective view of the sub-frame assembly used in the body structure shown in FIG. 1.
Figure 9:
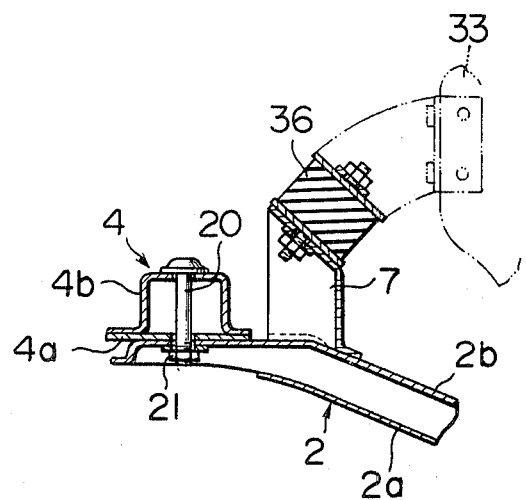
FIG. 9 is a sectional view of the front engine mount.
Figure 10:
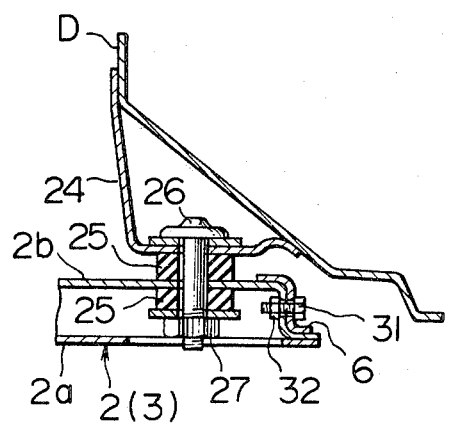
FIG. 10 is a sectional view of the side engine mount.

At the lower portion of the engine compartment E, there is provided a sub-frame assembly 1 which comprises, as shown in FIG. 2, a left side member 2, a right side member 3, a front cross-member 4, an intermediate cross-member 5 and a rear cross-member 6. The front cross-member 4 is secured to the front ends of the side members 2 and 3 by means of bolts 20 and nuts 21 as shown in FIG. 9 and the rear cross-member 6 is secured to the rear ends of the side members 2 and 3 by means of bolts 31 and nuts 32 as shown in FIG. 10 so as to form a rectangular frame configuration.

Figure 3:
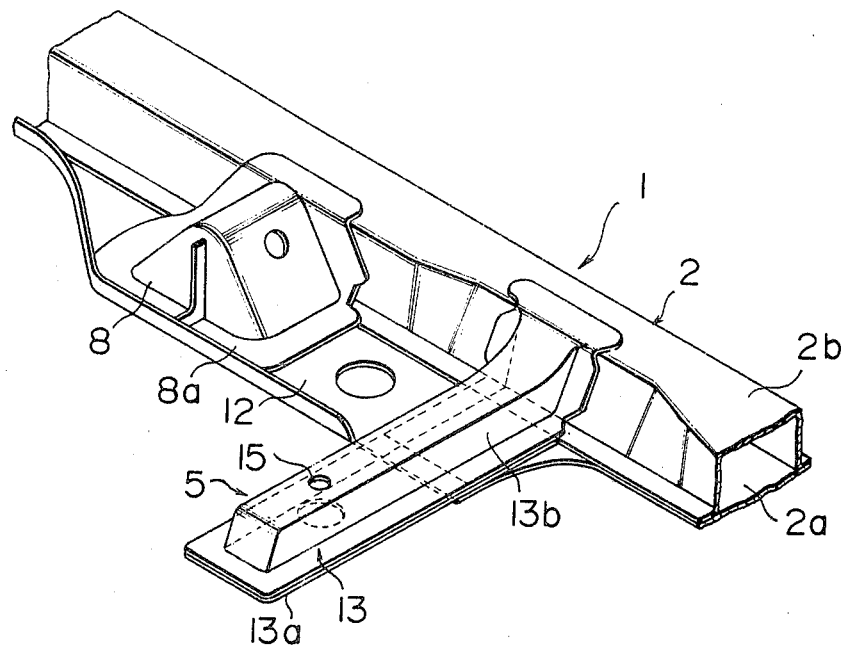
FIG. 3 is a fragmentary perspective view showing one side member having an engine mounting bracket.

At the front end of the left side member 2, there is a front engine mounting bracket 7. The left side member 2 is of a closed cross-section comprised of a substantially planar lower or bottom plate 2a and an inverted channel shaped upper or top plate 2b which are welded together at the opposite side edges. As shown in FIG. 3, the bottom plate 2a of the left side member 2 is formed with a transversely inward extension 12 on which a rear engine mounting bracket 8 is attached. The bracket 8 has a peripheral flange 8a which is placed on and welded on the extension 12 and the top plate 2b of the left side member 2.

The right side member 3 is provided with a pair of intermediate engine mounting brackets 9 as shown in FIG. 2. The side members 2 and 3 are further provided with suspension arm supporting brackets 11 for swingably attaching suspension arms 10. The suspension arm 10 is of a substantially A-shaped configuration and mounted on the side member 2 or 3 through the brackets 11 which are located at longitudinally spaced apart positions. The intermediate cross-member 5 is connected to the side member between the longitudinally spaced apart brackets 11. The intermediate cross-member 5 comprises a first member 13 and a second member 14. As shown in FIG. 3, the first member 13 of the intermediate cross-member 5 is of a closed cross-section comprised of a substantially planar lower or bottom plate 13a and an inverted channel shaped upper or top plate 13b which are welded together at the peripheries thereof. The first member 13 is secured at one end to the extension 12 of the bottom plate 2a of the left side member 2. Further, the top plate 13b of the first member 13 is welded at its peripheral flange to the top plate 2b of the left side member 2.

Figure 4:
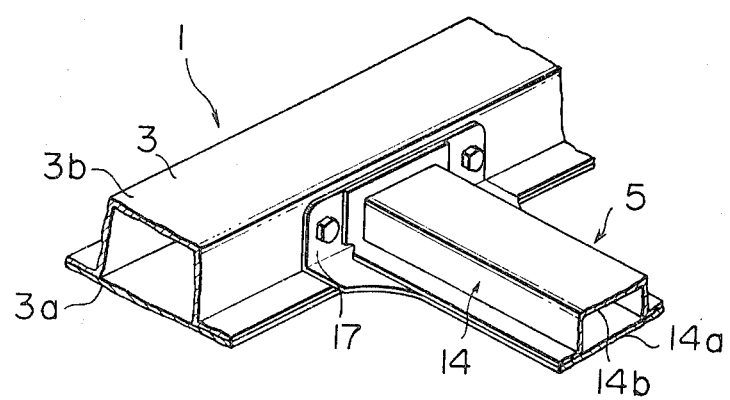
FIG. 4 is a fragmentary perspective view showing the connection between the other side member and the intermediate cross-member.
Figure 7:
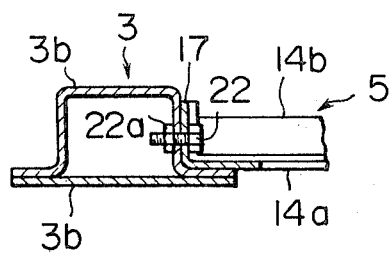
FIG. 7 is a sectional view of the connection shown in FIG. 4.

Referring now to FIG. 4, it will be noted that the right side member 3 is also of a closed cross-section comprised of a substantially planar bottom plate 3a and an inverted channel shaped top plate 3b which are welded together at the opposite side edges thereof. The second member 14 of the intermediate cross-member 5 is of a closed cross-section comprised of a substantially planar bottom plate 14a and an inverted channel shaped top plate 14b. The bottom plate 14a of the second member 14 is formed at an end with an upright flange 17 which is secured to the top plate 3b of the right side member 3 by means of bolts 22 and nuts 22a as shown in FIG. 7.

Figure 5:
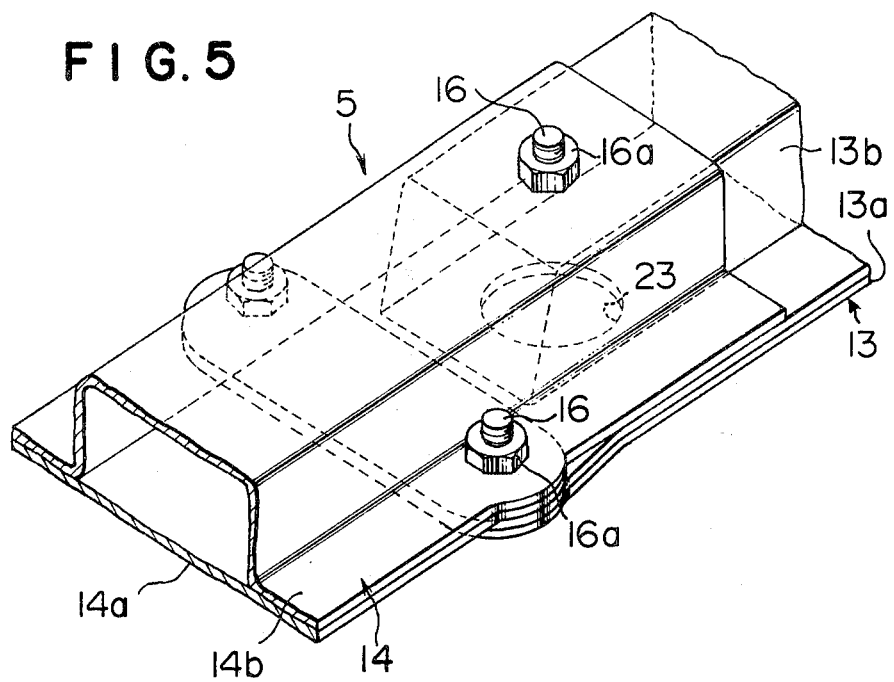
FIG. 5 is a fragmentary perspective view showing the connection between the first and second parts of the intermediate cross-member.
Figure 6:
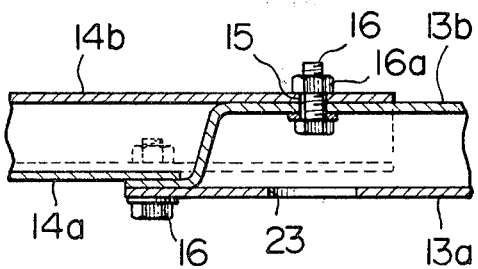
FIG. 6 is a sectional view of the connection between the first and second parts of the intermediate cross-member.

As shown in FIGS. 5 and 6, the other end of the second member 14 is placed over the free end of the first member 13 and secured thereto by means of bolts 16 and nuts 16a. For the purpose, the nuts 16a are secured or fitted to the second member 14 by means of welding and the bolts 16 are threaded into the nuts 16 through the first member 13. In order to facilitate the insertion of the bolts 16, the bottom plate 13a of the first member 13 is formed with an access hole 23. In this manner, the second member 14 of the intermediate cross-member 5 is removably attached to the right side member 3 and the first member 13. With this structure, it becomes possible to remove the transmission and the clutch disc assembly from the body together with the left side member 2 and the first member 13 by disconnecting the members 2 and 13 from the second member 14 and the cross-members 4 and 6 with the engine mounted on the right side member 3.

Figure 11:
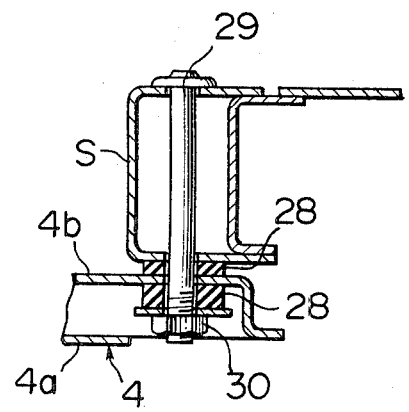
FIG. 11 is a sectional view showing the connection between the front frame side member and the front cross-member of the sub-frame assembly; and, FIG. 12 is a front view showing the arrangement of the engine on the sub-frame assembly.

The sub-frame assembly 1 thus formed is mounted on the front body frame by attaching the opposite ends of the front cross-member 4 to the side frames S and the rear ends of the side members 2 and 3 to the dash panel D. Referring to FIG. 10, the dash panel D has sub-frame mounting brackets 24 to which the rear ends of the side members 2 and 3 are secured through rubber cushions 25 by means of bolts 26 and nuts 27. At the front end portion of the sub-frame assembly 1, each end of the front cross-member 4 is secured to the side frame member S through rubber bushings 28 by means of a bolt 29 and a nut 30 as shown in FIG. 11. As shown in FIGS. 9 and 11, the front cross-member 4 is of a closed cross-section comprised of a substantially planar bottom plate 4a and an inverted channel shaped top plate 4b. Although not shown in the drawings, the rear cross-member 6 is also of a closed cross-section.

Figure 8:
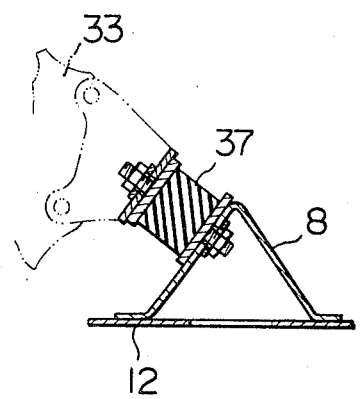
FIG. 8 is a sectional view of the rear engine mount.
Figure 12:
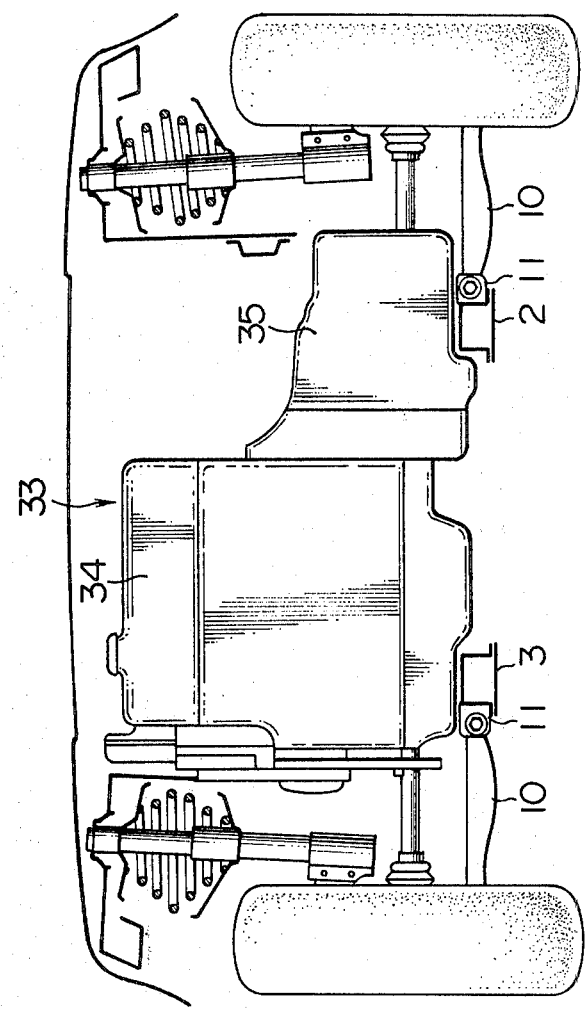

The engine assembly 33 comprises an engine 34 and a transmission 35 which are located above the sub-frame assembly 1 with the crankshaft directed transversely of the automobile body as shown in FIG. 12. The front left end portion of the engine assembly 33 is mounted on the front engine mounting bracket 7 through a rubber engine mount 36 as shown in FIG. 9. The rear left end portion of the engine assembly 33 is mounted on the engine mounting bracket 8 through a rubber engine mount 37 as shown in FIG. 8. The right side portion of the engine assembly 33 is mounted on the engine mounting brackets 9 through suitable rubber engine mounts. It will be understood that in the structure described above the extension 12 of the bottom plate 2a of the left side member 2 is stiffened by the intermediate cross-member 5 so that the load of the engine assembly 33 applied to the engine mounting bracket 8 is supported not only by the side member 2 but also by the cross-member 5.

The invention has thus been shown and described with reference to a specific embodiment, however, it should be noted that the invention is in no way limited to the details of the illustrated structures but changes and modifications may be made without departing from the scope of the appended claims. For example, the rear cross-member of the sub-frame assembly may be omitted. Further, the number of the side and cross-members may be changed as desired.

I claim:

1. An automobile body including a front body section formed with an engine compartment, sub-frame means provided in a lower portion of the engine compartment for mounting an engine, said sub-frame means comprising a plurality of longitudinally extending side members and a plurality of transversely extending cross-members, at least one of said side members being of a closed cross-section having an upper wall, a pair of side walls and a bottom wall, said bottom wall of the side member being formed with at least one transversely inward extension, an engine mounting bracket having connecting flanges connected respectively with one of said side walls and said extension, one of said cross-members having one end secured to said extension and the other end secured to the other of the side members.

2. An automobile body in accordance with claim 1 in which all members of the sub-frame assembly are of closed cross-sections.

3. An automobile body in accordance with claim 1 in which said one cross-member is comprised of a first and a second part which are removably connected together.

4. An automobile body in accordance with claim 3 in which one of said first and second parts of the cross-member which is adjacent to the side member having said extension is secured to said side member whereas the other part is attached to the other side member through removable connecting means.

5. An automobile body in accordance with claim 1 in which said one cross-member is secured also to the upper wall of the one side member and said mounting bracket has a further flange portion connected with the upper wall of said side member.

6. An automobile body including a front body section formed with an engine compartment, sub-frame means provided in a lower portion of the engine compartment for mounting an engine through a plurality of engine mounting brackets, said sub-frame means comprising a plurality of longitudinally extending side members and a plurality of transversely extending cross-members, each of said side members being of a closed cross-section having an upper wall and a bottom wall, said bottom wall of one side member being formed with at least one transversely inward extension, one of said mounting brackets being provided on said extension, one of said cross-members having one end secured to said extension and the other end secured to the other of the side members, the other engine mounting bracket being provided on the upper wall of at least one of said side members.

7. An automobile body including a front body section formed with an engine compartment, sub-frame means provided in a lower portion of the engine compartment for mounting an engine through three engine mounting brackets, said sub-frame means comprising a plurality of longitudinally extending side members and a plurality of transversely extending cross-members, each of said side members being of a closed cross-section having an upper wall and a bottom wall, said bottom wall of one side member being formed with at least one transversely inward extension, the first one of said mounting brackets being provided on said extension, one of said cross-members having one end secured to said extension and the other end secured to the other of the side members, the second engine mounting bracket being provided on the upper wall of said one side member, and the third engine mounting bracket being provided on the upper wall of the other side member.

8. An automobile body in accordance with claim 7 in which said third engine mounting bracket is located longitudinally between the first and second engine mounting brackets.

9. An automobile body in accordance with claim 8 in which said first engine mounting bracket is located longitudinally rearwards of said second engine mounting bracket.

10. An automobile body in accordance with claim 9 in which said one side member has a pair of side walls between said upper and bottom walls, said first engine mounting bracket having connecting flanges connected to said extension and the upper wall and one of the side walls of said one side member.

11. An automobile body in accordance with claim 6 which further includes a substantially A-shaped suspension arm connected to each side member at two points, one being forward and the other being rearward of said one cross-member.

12. An automobile body in accordance with claim 7 which further includes a substantially A-shaped suspension arm connected to each side member at two point one being forward and the other being rearward of said one cross-member.

13. An automobile body in accordance with claim 8 which further includes a substantially A-shaped suspension arm connected to each side member at two points, one being forward and the other being rearward of said one cross-member.

14. An automobile body in accordance with claim 9 which further includes a substantially A-shaped suspension arm connected to each side member at two points, one being forward and the other being rearward of said one cross-member.

* * * * *